(12) United States Patent
Lu et al.

(10) Patent No.: US 11,972,562 B2
(45) Date of Patent: Apr. 30, 2024

(54) METHOD FOR DETERMINING PLANT GROWTH CURVE AND ELECTRONIC DEVICE

(71) Applicant: HON HAI PRECISION INDUSTRY CO., LTD., New Taipei (TW)

(72) Inventors: Chih-Te Lu, New Taipei (TW); Chin-Pin Kuo, New Taipei (TW); Tzu-Chen Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 359 days.

(21) Appl. No.: 17/571,078

(22) Filed: Jan. 7, 2022

(65) Prior Publication Data
US 2022/0222813 A1    Jul. 14, 2022

(30) Foreign Application Priority Data

Jan. 12, 2021 (CN) .......................... 202110037822.7

(51) Int. Cl.
*G06T 7/00* (2017.01)
*G06T 5/70* (2024.01)
*G06T 7/30* (2017.01)
*G06T 7/50* (2017.01)
*G06T 7/90* (2017.01)

(52) U.S. Cl.
CPC .............. *G06T 7/0012* (2013.01); *G06T 5/70* (2024.01); *G06T 7/30* (2017.01); *G06T 7/50* (2017.01); *G06T 7/90* (2017.01); *G06T 2207/10024* (2013.01); *G06T 2207/10028* (2013.01); *G06T 2207/20081* (2013.01); *G06T 2207/30188* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 8,855,405 | B2 * | 10/2014 | Mas ....................... | G01C 23/00 |
| | | | | 382/106 |
| 11,074,495 | B2 * | 7/2021 | Zadeh ................. | G06F 18/2413 |
| 11,191,219 | B2 * | 12/2021 | Baurer ................ | G06F 16/5838 |
| 11,464,177 | B2 * | 10/2022 | Devecigil ........... | G05B 13/028 |

(Continued)

FOREIGN PATENT DOCUMENTS

| | | |
|---|---|---|
| CN | 109978904 A | 7/2019 |
| CN | 111862194 A | 10/2020 |

*Primary Examiner* — Anand P Bhatnagar
(74) *Attorney, Agent, or Firm* — ScienBiziP, P.C.

(57) ABSTRACT

A method for determining a plant growth curve includes obtaining color images and depth images of a plant to be detected at different time points, performing alignment processing on each color image and each depth image to obtain an alignment image, detecting the color image through a pre-trained target detection model to obtain a target bounding box, calculating an area ratio of the target bounding box in the color image, determining a depth value of all pixel points in the target boundary frame according to the aligned image, performing denoising processing on each depth value to obtain a target depth value, generating a first growth curve of the plant to be detected according to the target depth values and corresponding time points, and generating a second growth curve of the plant to be detected according to the area ratios and the corresponding time points.

14 Claims, 3 Drawing Sheets

(56) References Cited

U.S. PATENT DOCUMENTS

| | | | |
|---|---|---|---|
| 11,789,453 B2* | 10/2023 | Chowdhary | G06T 7/62 |
| | | | 382/110 |
| 2021/0056685 A1* | 2/2021 | Zhang | G06T 7/194 |
| 2021/0158041 A1* | 5/2021 | Chowdhary | G05D 1/0278 |
| 2021/0289692 A1* | 9/2021 | Zhang | A01C 21/007 |
| 2023/0031336 A1* | 2/2023 | Devecigil | G05B 13/028 |
| 2024/0061440 A1* | 2/2024 | Chowdhary | G06F 18/2155 |

* cited by examiner

METHOD FOR DETERMINING PLANT GROWTH CURVE AND ELECTRONIC DEVICE

FIELD

The subject matter herein generally relates to plant growth monitoring, and more particularly to a method for determining a plant growth curve and an electronic device implementing the method.

BACKGROUND

At present, a growth curve of a plant is determined based on manually monitoring and collecting measurement data. However, manual monitoring and measurement is time-consuming, labor-intensive, and costly. In addition, inaccurate measurement of plant growth curves may occur.

BRIEF DESCRIPTION OF THE DRAWINGS

Implementations of the present disclosure will now be described, by way of embodiments, with reference to the attached figures.

DETAILED DESCRIPTION

Figure 1:
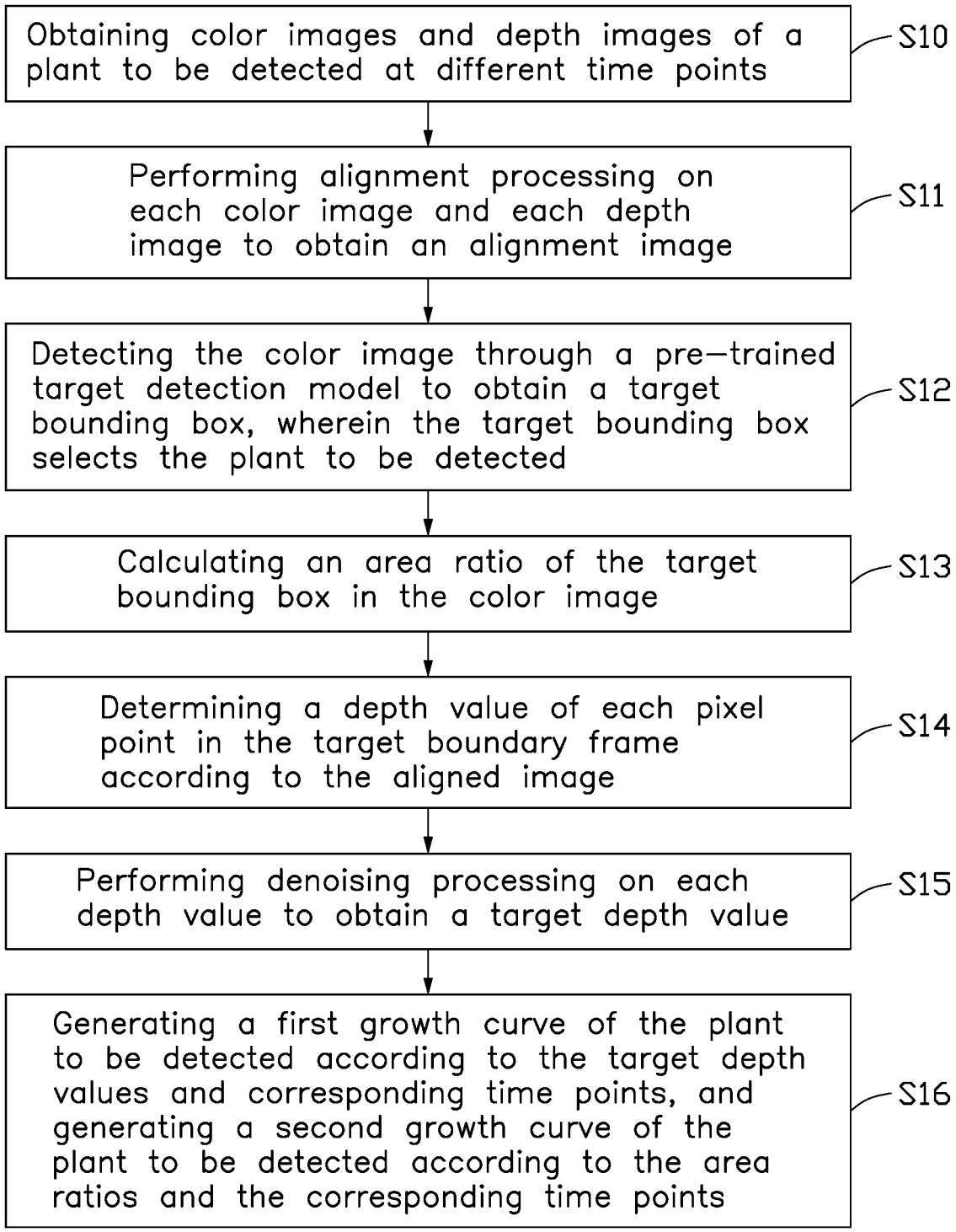
FIG. 1 is a flowchart of an embodiment of a method for determining a plant growth curve.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows a flowchart of an embodiment of a method for determining a plant growth curve. According to different needs, the order of blocks in the flowchart may be changed, and some blocks may be omitted or combined.

At block S10, color images and depth images of a plant to be detected are obtained at different time points.

In one embodiment, the color image refers to an RGB three-channel color image, and the depth image refers to an image in which a distance from the camera to each point in a shooting scene is equal to a pixel value.

In one embodiment, the camera device includes a color camera and a depth camera. The camera device may be mounted directly above the plant to be detected. The color camera obtains the color images of the plant to be detected, and the depth camera obtains the depth images of the plant to be detected. The camera device sends the color images and the depth images to an electronic device.

In one embodiment, the camera device obtains the color images and the depth images of the plant to be detected at different time points. Specifically, a plurality of time points at which the camera device photographs the plant to be detected are set. The plurality of time points is set having a same time interval. For example, an initial time point is set to 12:00 on January 1, and the time interval of the camera device is set to 24 hours. In this way, the color images and the depth images of the plant to be detected can be quickly obtained. The initial time point and the time interval of the camera device can be set according to different requirements.

In one embodiment, before block S10, the method for determining a plant growth curve further includes training a target detection model. For example, the target detection model may be a Single Shot MultiBox Detector target detection model.

Specifically, a method of training the target detection model includes:

Obtaining a sample plant color image;

Performing feature extraction on the sample plant color image through a residual convolution network to obtain feature information;

Generating a first feature map through a feature pyramid network according to the feature information;

Generating candidate regions through a regional candidate network according to the first feature map;

Screening the candidate regions according to a preset intersection ratio threshold to obtain a target region having an intersection ratio greater than the preset intersection ratio threshold, wherein the intersection ratio is a ratio of an intersection area of an anchor box and a real bounding box to a combined area;

Inputting the first feature map and the target region into a region of interest pooling layer to obtain a second feature map corresponding to the target region; and Performing a regression on the bounding box and a category of the target region according to the second feature map to obtain the trained target detection model.

At block S11, alignment processing is performed on each color image and each depth image to obtain an alignment image.

In one embodiment, the alignment image refers to an image generated by mapping all depth pixels in the depth image to the color image.

In one embodiment, a method of the electronic device performing alignment processing on each color image and each depth image to obtain the aligned image includes:

Obtaining depth pixel points of the depth image;

Multiplying the depth pixel points by a first matrix to obtain depth coordinates of the depth pixel points in a depth camera coordinate system;

Multiplying the depth coordinates of the depth pixel points by a second matrix to obtain world coordinates of the depth pixel points in a world coordinate system;

Multiplying the world coordinates of the depth pixel points by a third matrix to obtain color coordinates of the depth pixel points in a color camera coordinate system;

Multiplying the color coordinates of the depth pixel points by a fourth matrix to obtain pixel points of the depth pixel points in the color image; and Obtaining the alignment image according to the pixel points of the depth pixel points in the color image.

The first matrix is an inverse matrix of an internal parameter matrix of the depth camera. The second matrix is an external parameter matrix converted from the depth camera coordinate system to the world coordinate system. The third matrix is an external parameter matrix converted from the world coordinate system to the color camera coordinate system. The fourth matrix is an internal parameter matrix of the color camera. The depth camera coordinate system, the color camera coordinate system, and the world coordinate system can be obtained from an open source system, or can be arbitrarily set by a user according to an application scenario.

The growth curve of the plant to be detected can be accurately determined through the alignment image containing a depth value.

At block S12, the color image is detected through a pre-trained target detection model to obtain a target bounding box. The target bounding box selects the plant to be detected.

The target bounding box obtained by the pre-trained target detection model has a relatively high accuracy, and the target bounding box can be quickly detected, thereby improving a detection efficiency.

At block S13, an area ratio of the target bounding box in the color image is calculated.

As the plant to be detected grows, an area of the plant photographed will increase, and an area occupied by the target candidate frame in the image will also increase. A growth trend of the plant is reflected by the area ratio of the target bounding box in the color image.

In one embodiment, a method of the electronic device calculating the area ratio of the target bounding box in the color image includes:

Calculating an area of the color image;

Calculating an area of the target bounding box; and

Determining the area ratio according to the area of the bounding box and the area of the color image.

At block S14, a depth value of each pixel point in the target boundary frame are determined according to the aligned image.

In one embodiment, the depth value refers to a height of the pixel point corresponding to a feature point on the plant to be detected from the camera device.

The electronic device determines a target position of each pixel point on the alignment image, acquires the depth value at the target position in the alignment image, and uses the depth value as the depth value of each pixel point. The depth values of all pixel points can be accurately and quickly determined through the alignment image.

At block S15, denoising processing is performed on each depth value to obtain a target depth value.

Since the image is often affected by interference of imaging equipment and external environmental noise, it is necessary to perform denoising processing on the depth value.

In one embodiment, a method of the electronic device performing denoising processing on the depth value to obtain the target depth value includes:

Comparing the depth value of the pixel point in the target bounding box to a preset depth value, wherein a size of the preset depth value can be set or modified according to actual needs of a user; for example, the preset depth value can be set to zero;

In response that the depth value of the pixel point is not equal to the preset depth value, setting the depth value of the pixel point as the target depth value; and In response that the depth value of the pixel point is equal to the preset depth value, setting the depth value of the pixel point as a noise point and deleting the noise point.

By performing denoising processing on the depth value to obtain the target depth value, it can be ensured that the target depth value does not contain interference information, and thus the growth curve of the plant to be detected can be accurately determined.

At block S16, a first growth curve of the plant to be detected is generated according to the target depth values and corresponding time points, and a second growth curve of the plant to be detected is generated according to the area ratios and the corresponding time points.

In one embodiment, a method of the electronic device generating the first growth curve of the plant according to the target depth values and the corresponding time points includes:

Establishing a first coordinate system defining O as an origin, time as an X-axis, and depth as a Y-axis;

Determining a plurality of first target coordinate points in the first coordinate system according to the target depth values and the corresponding time points, wherein an ordinate coordinate of the first target coordinate point is a target depth value, and an abscissa coordinate of the first target coordinate point is a time point; and Connecting the plurality of first target coordinate points to obtain the first growth curve.

In one embodiment, a method of the electronic device generating the second growth curve of the plant according to the area ratios and the corresponding time points includes:

Establishing a second coordinate system defining O as an origin, time as an X-axis, and area ratio as a Y-axis;

Determining a plurality of second target coordinate points in the second coordinate system according to the area ratios and the corresponding time points, wherein an ordinate coordinate of the second target coordinate point is the area ratio, and an abscissa coordinate of the second target coordinate point is the time point; and Connecting the plurality of second target coordinate points to obtain the second growth curve.

The method for determining the plant growth curve can accurately determine the growth curve of plants, supervise the plants, reduce planting costs, and improve crop yield and quality.

Figure 2:
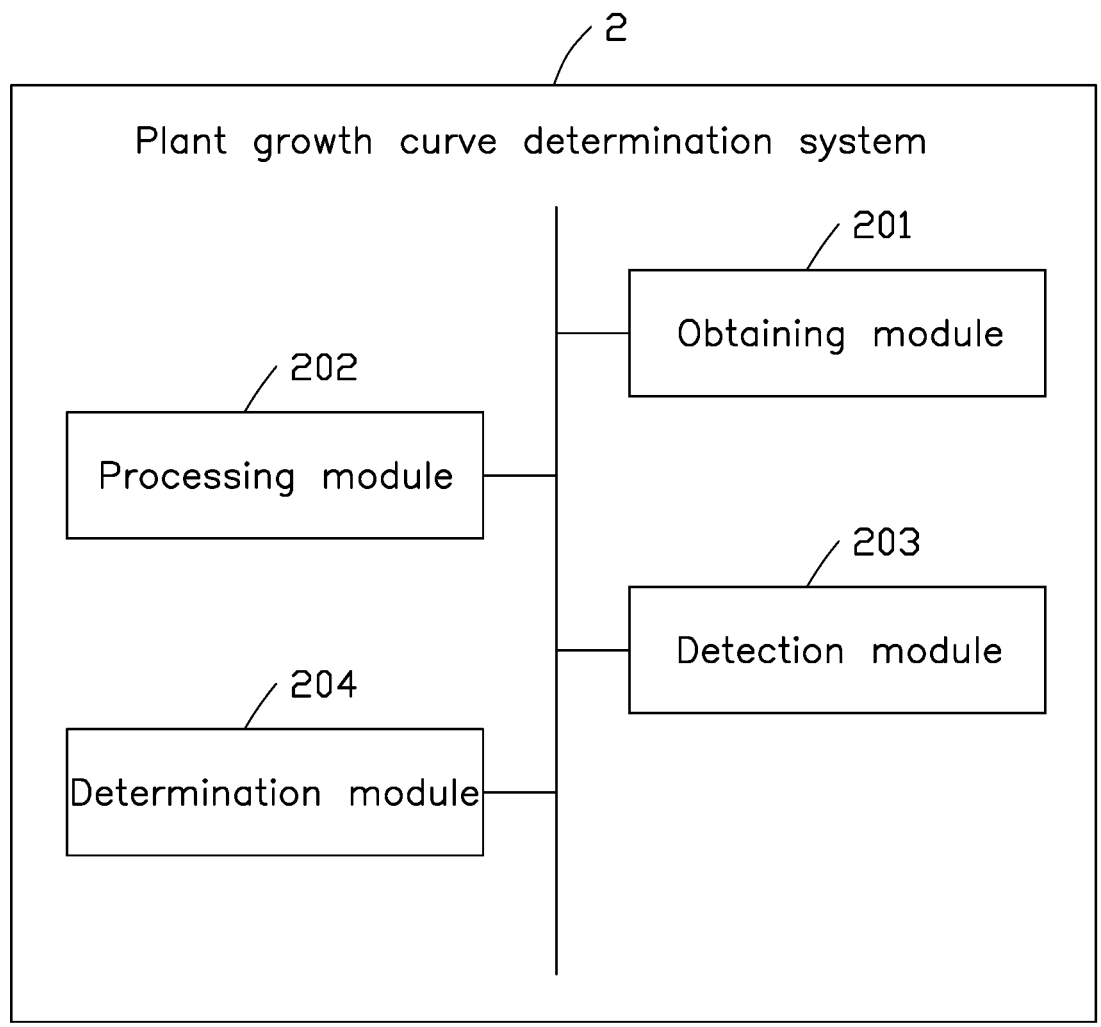
FIG. 2 is a block diagram of an embodiment of a plant growth curve determination system.

FIG. 2 shows a block diagram of an embodiment of function modules of a plant growth curve determination system 2. The plant growth curve determination system 2 includes an obtaining module 201, a processing module 202, a detection module 203, and a determination module 204. In one embodiment, the plant growth curve determination system 2 may be applied in an electronic device that is coupled to a camera device.

The obtaining module 201 controls the camera device at time points to obtain color images and depth images of the plant to be detected.

The processing module 202 performs alignment processing on each color image and each depth image to obtain an aligned image.

The detection module 203 detects each color image through a pre-trained target detection model to obtain a target bounding box, wherein the target bounding box selects the plant to be detected.

The determination module 204 calculates an area ratio of the target bounding box in the color image. The determination module 204 further determines a depth value of each pixel point in the target boundary frame according to the aligned image.

The processing module 202 further performs denoising processing on each depth value to obtain a target depth value.

The determination module 204 further generates a first growth curve of the plant according to the target depth values and the corresponding time points, and generates a second growth curve of the plant according to the area ratios and the corresponding time points.

In one embodiment, the obtaining module 201 further obtains color images of sample plants.

The plant growth curve determination system 2 may further include an extraction module, a generation module, a screening module, an input module, and a regression module.

The extraction module is configured to perform feature extraction on the sample plant color image through a residual convolution network to obtain feature information.

The generation module is configured to generate a first feature map through a feature pyramid network according to the feature information. The generation module is further configured to generate candidate regions through a regional candidate network according to the first feature map.

The screening module is configured to screen the candidate regions according to a preset intersection ratio threshold to obtain a target region.

The input module is configured to input the first feature map and the target region into a region of interest pooling layer to obtain a second feature map corresponding to the target region.

The regression module is configured to perform a regression on the bounding box and a category of the target region according to the second feature map to obtain the trained target detection model.

The plant growth curve determination system 2 described in FIG. 2 can accurately determine the growth curve of plants, supervise the plants, reduce planting costs, and improve crop yield and quality.

Figure 3:
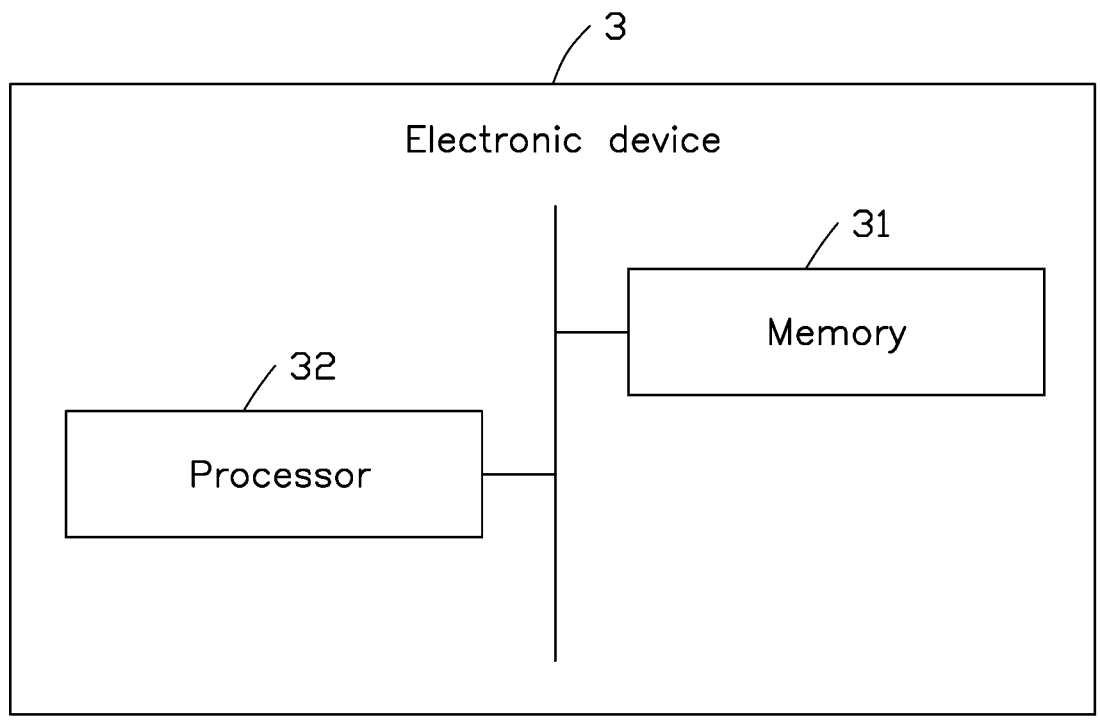
FIG. 3 is a block diagram of an embodiment of an electronic device.

FIG. 3 shows a block diagram of an embodiment of an electronic device for determining a plant growth curve.

In one embodiment, the electronic device 3 includes, but is not limited to, a memory 31, a processor 32, and a computer program that is stored in the memory 31 and executable by the processor 32.

FIG. 3 is only an example of the electronic device 3 and does not constitute a limitation on the electronic device 3. In other embodiments, the electronic device 3 may include more or fewer components than those shown in FIG. 3, have a combination of certain components, or have different components. For example, the electronic device 3 may also include input and output devices, network access devices, buses, and so on.

The electronic device 3 may be, but is not limited to, any electronic product that can interact with a user through a keyboard, a mouse, a remote control, a touch panel, or a voice control device. A network where the electronic device 3 is located may include, but is not limited to, the Internet, a wide area network, a metropolitan area network, a local area network, a virtual private network, etc.

The at least one processor 32 may be a CPU, general-purpose processor, digital signal processor, application specific integrated circuits, field programmable gate array, or other programmable logic device, transistor logic device, discrete hardware component, or the like. The processor 32 can be a microprocessor or a conventional processor. The processor 32 is a control center of the electronic device 3 and connects the parts of the entire electronic device 3 through various interfaces and lines.

The memory 31 may be used to store the computer program and/or modules of the plant growth curve determination system 2. The processor 32 runs or executes the computer program and/or modules stored in the memory 31. In addition, the memory 31 may include a non-volatile memory, such as a hard disk, a memory, a plug-in hard disk, a smart memory card, a secure digital card, a flash memory card, at least one disk storage device, flash memory device, etc.

When the computer program is executed, the blocks in the method for determining a plant growth curve described in FIG. 1 may be implemented. Alternatively, when the computer program is executed, the function modules described in FIG. 2 may be implemented.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for determining a plant growth curve comprising:
    obtaining color images and depth images of a plant to be detected at different time points;
    performing alignment processing on each color image and each depth image to obtain an alignment image;
    detecting the color image through a pre-trained target detection model to obtain a target bounding box, the target bounding box selecting the plant to be detected;
    calculating an area ratio of the target bounding box in the color image;
    determining a depth value of each pixel point in the target boundary frame according to the aligned image;
    performing denoising processing on each depth value to obtain a target depth value;
    generating a first growth curve of the plant to be detected according to the target depth values and corresponding time points; and
    generating a second growth curve of the plant to be detected according to the area ratios and the corresponding time points.

2. The method for determining a plant growth curve of claim 1, wherein a method for generating the first growth curve comprises:
   establishing a first coordinate system;
   determining a plurality of first target coordinate points in the first coordinate system according to the target depth values and the corresponding time points; and
   connecting the plurality of first target coordinate points to obtain the first growth curve.

3. The method for determining a plant growth curve of claim 1, wherein a method for generating the second growth curve comprises:
   establishing a second coordinate system;
   determining a plurality of second target coordinate points in the second coordinate system according to the area ratios and the corresponding time points; and
   connecting the plurality of second target coordinate points to obtain the second growth curve.

4. The method for determining a plant growth curve of claim 1, wherein a method of performing alignment processing on each color image and each depth image to obtain the aligned image comprises:
   obtaining depth pixel points of the depth image;
   multiplying the depth pixel points by a first matrix to obtain depth coordinates of the depth pixel points in a depth camera coordinate system;
   multiplying the depth coordinates of the depth pixel points by a second matrix to obtain world coordinates of the depth pixel points in a world coordinate system;
   multiplying the world coordinates of the depth pixel points by a third matrix to obtain color coordinates of the depth pixel points in a color camera coordinate system;
   multiplying the color coordinates of the depth pixel points by a fourth matrix to obtain pixel points of the depth pixel points in the color image; and
   obtaining the alignment image according to the pixel points of the depth pixel points in the color image.

5. The method for determining a plant growth curve of claim 4, wherein:
   the first matrix is an inverse matrix of an internal parameter matrix of the depth camera;
   the second matrix is an external parameter matrix converted from the depth camera coordinate system to the world coordinate system;
   the third matrix is an external parameter matrix converted from the world coordinate system to the color camera coordinate system; and
   the fourth matrix is an internal parameter matrix of the color camera.

6. The method for determining a plant growth curve of claim 1, wherein a method of calculating the area ratio of the target bounding box in the color image comprises:
   calculating an area of the color image;
   calculating an area of the target bounding box; and
   determining the area ratio according to the area of the bounding box and the area of the color image.

7. The method for determining a plant growth curve of claim 1, wherein a method of performing denoising processing on the depth value to obtain a target depth value comprises:
   comparing the depth value of the pixel point in the target bounding box to a preset depth value;
   in response that the depth value of the pixel point is not equal to the preset depth value, setting the depth value of the pixel point as the target depth value; and
   in response that the depth value of the pixel point is equal to the preset depth value, setting the depth value of the pixel point as a noise point and deleting the noise point.

8. An electronic device comprising:
   a processor; and
   a memory storing a plurality of instructions, which when executed by the processor, cause the processor to:
      obtain color images and depth images of a plant to be detected at different time points;
      perform alignment processing on each color image and each depth image to obtain an alignment image;
      detect the color image through a pre-trained target detection model to obtain a target bounding box, the target bounding box selecting the plant to be detected;
      calculate an area ratio of the target bounding box in the color image;
      determine a depth value of each pixel point in the target boundary frame according to the aligned image;
      perform denoising processing on each depth value to obtain a target depth value;
      generate a first growth curve of the plant to be detected according to the target depth values and corresponding time points; and
      generate a second growth curve of the plant to be detected according to the area ratios and the corresponding time points.

9. The electronic device of claim 8, the processor generates the first growth curve by:
   establishing a first coordinate system;
   determining a plurality of first target coordinate points in the first coordinate system according to the target depth values and the corresponding time points; and
   connecting the plurality of first target coordinate points to obtain the first growth curve.

10. The electronic device of claim 8, wherein the processor generates the second growth curve by:
    establishing a second coordinate system;
    determining a plurality of second target coordinate points in the second coordinate system according to the area ratios and the corresponding time points; and
    connecting the plurality of second target coordinate points to obtain the second growth curve.

11. The electronic device of claim 8, wherein the processor performs alignment processing on each color image and each depth image to obtain the aligned image by:
    obtaining depth pixel points of the depth image;
    multiplying the depth pixel points by a first matrix to obtain depth coordinates of the depth pixel points in a depth camera coordinate system;
    multiplying the depth coordinates of the depth pixel points by a second matrix to obtain world coordinates of the depth pixel points in a world coordinate system;
    multiplying the world coordinates of the depth pixel points by a third matrix to obtain color coordinates of the depth pixel points in a color camera coordinate system;
    multiplying the color coordinates of the depth pixel points by a fourth matrix to obtain pixel points of the depth pixel points in the color image; and
    obtaining the alignment image according to the pixel points of the depth pixel points in the color image.

12. The electronic device of claim 11, wherein:
    the first matrix is an inverse matrix of an internal parameter matrix of the depth camera;

the second matrix is an external parameter matrix converted from the depth camera coordinate system to the world coordinate system;

the third matrix is an external parameter matrix converted from the world coordinate system to the color camera coordinate system; and the fourth matrix is an internal parameter matrix of the color camera.

13. The electronic device of claim 8, wherein the processor calculates the area ratio of the target bounding box in the color image by:

calculating an area of the color image;

calculating an area of the target bounding box; and determining the area ratio according to the area of the bounding box and the area of the color image.

14. The electronic device of claim 8, wherein the processor performs denoising processing on the depth value to obtain a target depth value by:

comparing the depth value of the pixel point in the target bounding box to a preset depth value;

in response that the depth value of the pixel point is not equal to the preset depth value, setting the depth value of the pixel point as the target depth value; and in response that the depth value of the pixel point is equal to the preset depth value, setting the depth value of the pixel point as a noise point and deleting the noise point.

* * * * *